United States Patent
Yves et al.

(10) Patent No.: US 7,691,220 B2
(45) Date of Patent: Apr. 6, 2010

(54) METHOD OF DEPOSITING FUNCTIONAL FILMS ON SUBSTRATES SUCH AS GLASS SHEETS AND FILM-COATING MACHINE FOR IMPLEMENTING SAID METHOD

(75) Inventors: Demars Yves, Agnetz (FR); Douche Jean-Pierre, Impasse des Pins (FR)

(73) Assignee: Saint-Gobain Glass France, Courbevoie (FR)

( * ) Notice: Subject to any disclaimer, the term of this patent is extended or adjusted under 35 U.S.C. 154(b) by 421 days.

(21) Appl. No.: 10/550,148

(22) PCT Filed: Mar. 22, 2004

(86) PCT No.: PCT/FR2004/000705

§ 371 (c)(1), (2), (4) Date: Jul. 24, 2006

(87) PCT Pub. No.: WO2004/085135

PCT Pub. Date: Oct. 7, 2004

(65) Prior Publication Data

US 2007/0034327 A1  Feb. 15, 2007

(30) Foreign Application Priority Data

Mar. 21, 2003 (FR) .................................. 03 03611

(51) Int. Cl.
- B29C 65/00 (2006.01)
- B32B 37/00 (2006.01)
- B32B 38/04 (2006.01)
- B29C 65/10 (2006.01)

(52) U.S. Cl. ........................................ 156/251; 156/497

(58) Field of Classification Search ................. 156/251, 156/497

See application file for complete search history.

(56) References Cited

U.S. PATENT DOCUMENTS

| 3,971,691 A | 7/1976 | Cairns |
| 4,264,400 A | 4/1981 | Breitmar |
| 6,354,109 B1 * | 3/2002 | Boire et al. ................. 65/60.1 |

FOREIGN PATENT DOCUMENTS

EP  0 547 327  6/1993

(Continued)

*Primary Examiner*—Philip C Tucker
*Assistant Examiner*—Michael N Orlando
(74) *Attorney, Agent, or Firm*—Oblon, Spivak, McClelland, Maier & Neustadt, L.L.P.

(57) ABSTRACT

A method of depositing at least one functional film on at least one part of one or two faces of flat or curved substrates. The substrates are conveyed individually to a film-coating station and are advanced therein along the plane or neutral plane thereof. The film-coating station includes a film-applicator assembly including at least one axis perpendicular to the direction of advancement of the substrate and parallel to the advancement plane, at least one reel of film being mounted to the assembly. The method: conveys the leader of the film from each of the reels, which is to be applied to, and held against one face of, the substrate at a selected position, into the film-coating station; unwinds the reels such that the film can be applied in at least one strip to the advancing substrate; and cuts the film at a selected moment. Moreover, the new film leader is held to be ready to be applied at the selected position on the same substrate on a subsequent substrate.

13 Claims, 2 Drawing Sheets

FOREIGN PATENT DOCUMENTS

| | | | | | |
|---|---|---|---|---|---|
| GB | 2 033 947 | 5/1980 | JP | 09 226007 | 9/1997 |

* cited by examiner

METHOD OF DEPOSITING FUNCTIONAL FILMS ON SUBSTRATES SUCH AS GLASS SHEETS AND FILM-COATING MACHINE FOR IMPLEMENTING SAID METHOD

The present invention relates to a method and to a film-coating machine by which at least one functional film can be deposited on at least a part of one face or of both faces of flat or curved substrates.

The present invention relates, inter alia, to the protection of fragile surfaces of sheet-type substrates to prevent them from being damaged by impact, scratches, etc. as they are transported from the production site to a usage site or assembly site, as well as during said assembly.

In particular, the present invention relates to the protection of surfaces of glass sheets, especially of glass at least one face of which has been treated, for example by the application of a functional layer which has to be kept in condition throughout the handling and transport from the production venue to the assembly site where the sheet must generally be cut to different dimensions of panes to be fitted.

At present, glass sheets of full float length (plf) or cut float width (dlf) type are protected by plastic, self-adhesive, peelable films, which are applied to said sheets running horizontally one after the other, said sheets being spaced apart by a short distance, of the order of 20 to 25 mm. This protection method is not very practical.

In actual fact, the dimensions of the films which are commercially available and those of the sheets or plates of glass are such that it is often necessary to use two reels of film instead of one, the two films overlapping in the middle region of the sheet.

Moreover, where there is no wish to protect the edges of the sheet, it is worth pointing out that, though it is known how to commence the film-coating at a distance from a first transverse edge of the sheet, it is not possible in practice to halt the film-coating at a given distance from the opposite edge or at the limit of this edge. In these circumstances, there is no option but to glue the film onto the following sheet and then cut the film between the two sheets. As a result, this film-coating process is a time-consuming operation.

Another major drawback of the current method is that it necessarily leads to the whole or virtually the whole of the sheet being coated (in any event, as indicated above, never sparing the four margins of the sheet). As the sheets, in particular the glass sheets, are generally intended to be cut at the place of assembly into the panes to be fitted, the operator is forced to remove the film before applying his cutting wheel. The sheet is therefore not effectively protected up to the actual moment of fitting, with a not inconsiderable risk of damage to the surface of the glass during cutting and fitting.

Thus, the current film-coating method is therefore not satisfactory, since it takes no account of the following different aspects:

(1) the film-coating operation should allow uncovered zones to be set aside anywhere on the surface of the sheet in order especially to facilitate the subsequent sheet-cutting work, the locations of these uncovered zones, if so desired, being able to be prearranged as a function of the intended purpose of the sheets, this for workshop-prepared or factory-prepared sheet batches;

(2) the film-coating should be able to be performed in much shorter times, if possible in masked time; in actual fact, this film-coating operation is incorporated into a production chain, the film-coating machine advantageously having to be an automatic machine, whereby the perfect application of the film without air bubbles and without manual operation of the film-cutting, as is the case with the known method, is directly assured; and (3) the sheets should advantageously be able to be delivered to the film-coating operation no longer horizontally but vertically, or slightly inclined relative to the vertical, in order to reduce the floor space requirement.

The present invention allows the aforesaid objective (1) to be met and, in advantageous embodiments thereof, objectives (2) and (3) also.

A first subject of the present invention is therefore a method for depositing at least one functional film on at least a part of one face or of both faces of flat or curved substrates, characterized in that the substrates are led one by one into a film-coating station so as to be advanced therein along their plane or mean plane, a film applicator unit, comprising at least one axis which is perpendicular to the direction of advancement and parallel to the plane of advancement and on which there is mounted at least one reel of film, being disposed in said film-coating station, and in that, in this station, the leader of the film of each of the reels is brought to be applied to and held against one face of the substrate at a chosen location, the unwinding of the reel or reels of film is triggered with a view to the film being applied in strip(s) to the advancing substrate, then the film or films is/are cut at a chosen moment and the new film leader is held so that it is ready to be applied at the chosen location on the same substrate, or on a following substrate, the band width of each of the reels and their location on the axes being chosen as a function of the regions of the substrates which are to be covered by the films.

Advantageously, the substrates are advanced successively along their plane or mean plane by being led, in the course of their advancement, one by one into the film-coating station.

The unwinding of the reels is triggered by the advancement of the substrate and/or by a reel-unwinding command.

According to a first embodiment of the method according to the invention, an applicator unit is used comprising an axis on which there is mounted at least one reel of film, whereby on one face of the substrate, in the direction of advancement of the substrate, as many parallel bands or strips can be applied as there are reels, the beginning and the end of each band being precisely positioned on said substrate, said bands being mutually spaced apart and the application of the bands being able to be halted and resumed on one and the same substrate in the course of its advancement.

According to a second embodiment of the method according to the invention, an applicator unit is used comprising at least two parallel axes, each axis bearing at least one reel, at least one reel borne by an axis being staggered relative to at least one reel borne by the neighboring axis, whereby on one face of the substrate, in the direction of advancement of the substrate, as many parallel bands or strips can be applied as there are reels, the beginning and the end of each band being precisely positioned on said substrate, said bands being able to overlap according to the location of two neighboring reels on their two axes and the application of the bands being able to be halted and resumed on one and the same substrate in the course of its advancement.

This technique of film coating in strips, with or without overlap, opens up the possibility, if necessary, of peripheral margination of a glass sheet, with no subsequent cutting of the film, for use in a glazed frame with glazing bead. This can be achieved without film squeezed beneath the glazing bead, which no longer allows the film to be stripped from the pane after it is fitted.

Traditional film-coating techniques require a cut to be made at the extremity of the glass, which calls for a repeat run for make up purposes with a cutting tool, which generally proceeds to scratch the surface of the glass.

The film-based protection can avoid the use, moreover, of protective inserts necessary for the transportation and handling phases.

The substrates can be fed into the film-coating station vertically or in a position slightly inclined relative to the vertical, or, indeed, horizontally.

A functional film can be used which is peelable, bonded, partially bonded, bonded on pre-cut zones, or of the decal transfer type. The functional film can be chosen, moreover, from amongst protective films, decorative films, information-carrying films and mechanical reinforcement films.

The films that can be used are, in particular, films familiar to those skilled in the art, which are non-polluting and weather-resistant or UV-resistant, such as films made of PET, low-density polyethylene, polypropylene possibly coated with an acrylic adhesive layer, acrylic films, etc. These films, left in place during fitting, will usefully be able to be used as data carriers (fitting or maintenance conditions) and/or advertising media.

The coating of glass sheets can be carried out, in particular, on sheets of monolithic or laminated glass or glass for multiple glazings, having, on at least one face, a functional layer, such as a dirt-repellant layer, a shatterproof layer, a surfacing film, said glass sheets being flat or with rounded or curved faces, said sheets being intended to form panes or to be cut to obtain panes or being intended to form windshields or automobile windows.

In particular, the coating can be carried out on flat glass sheets intended to be cut to form panes, characterized in that the application is realized of peelable protective film strips according to the aforesaid first embodiment so that the uncoated zones are arranged in a grid pattern, each zone coated by a strip corresponding to the daylight of a pane, and the uncoated zones being intended to allow the direct cutting of the glass forming the margins of the panes intended to be introduced into the rabbets of the frames and to be hidden from view by glazing beads.

Should the coating of curved substrates be performed, a film can advantageously be chosen, the extensibility properties of which allow it to be applied to all of the planned application regions and/or that the width of the reels and hence of the strips is regulated as a function of the radius of curvature, the width of the strips being all the less since the radius of curvature is small.

The method according to the present invention can likewise comprise the operations consisting in:
defining for each of the substrates, as a function of its intended purpose and on at least one outer face of said substrate, the region or regions which are due to receive a film and the region or regions which do not need to be coated by the film;
feeding said substrates successively into the film-coating station and commanding, for each of them, the application of film in the regions intended to receive such a film; and
gathering the substrates which are thus coated.

In particular, by computerized calculation, an optimization of the positioning of the film on the different substrates of the succession of substrates can be realized as a function of the dimension of the substrates and the relative position of the regions due to be coated and the regions not due to be coated.

The optimization can equally be realized as a function of the fitment of the reels and the different reels which said fitment is capable of receiving.

The present invention likewise relates to a film-coating machine for implementing the method as defined above, characterized in that it comprises:
a supporting and successive transfer structure for the substrates to be protected, along their plane or their mean plane;
a film applicator unit comprising at least one perpendicular axis in the planned direction of advancement of the substrates and parallel to the plane of advancement, an axis on which at least one reel of film is capable of being mounted in such a way that the leader of the film proceeds to apply itself to the face of the substrate to be coated as this substrate is transferred, said unit being capable of receiving for each substrate in the course of transfer the necessary number of reels and of a band width chosen to form on each substrate the planned coating in strips, said reels likewise being at least partially adjustable in height so as to form on each substrate the planned coating in strips;
means for commanding, at any desired moment, the application of the leader of the film of a reel to the substrate; and
means for cutting the band at any desired moment once application is finished, means being provided for holding the new leader formed after the cutting of the band so that it is ready to be re-applied.

A film applicator unit can comprise one or two separate, mutually parallel axes, each axis bearing at least one reel.

The reels can be activable individually or by groups of reels.

The film applicator unit can be movable toward or away from the substrates to be coated, said applicator unit being able to be displaceable in translation in order to adjust to the dimensions of the substrate or of the make up height of the film.

The reels can be mounted in such a way that their leader proceeds to apply itself to the face of the substrate to be coated after passing over an applicator roll.

With each applicator roll can be combined a retractable suction nozzle disposed downstream of said roll on the side opposite the substrate, such that the leader is sucked against said nozzle in order to be held ready to be applied to the substrate, the deactivation of said suction commanding the application to the substrate of the leader of the film, especially by an adhesive face of said film or by dint of its electrostatic nature.

The cutting means for the film can be constituted by a hot wire which is retractable when not in use and is mounted on the side opposite the substrate.

With each reel can be combined a roll for applying the film to the substrate following the cutting of said film.

Each reel can form part of a film-application module comprising a tension roll for the film unwound from the reel prior to passing over the applicator roll, a device for loading a new reel of film and for automatically repositioning the film advantageously being incorporated in said module.

At least one axis of the applicator unit can be capable of receiving different sets of reels of different band widths.

The present invention likewise relates to sheets, especially sheets of monolithic glass, laminated, coated with functional layers, such as panes, sheets to be cut to form panes, windshields, additionally comprising on at least one of their faces a functional film applied in regions delimited along strips, which strips can have overlapping margins.

The functional layers can be dirt-resistant layers, shatterproof layers, surfacing films, etc.

Said sheets may have been obtained by the method as defined above.

In order better to illustrate the subject of the present invention, a particular embodiment will emerge below, on an indicative and non-limiting basis, with reference to the appended drawing, in which.

Figure 1:
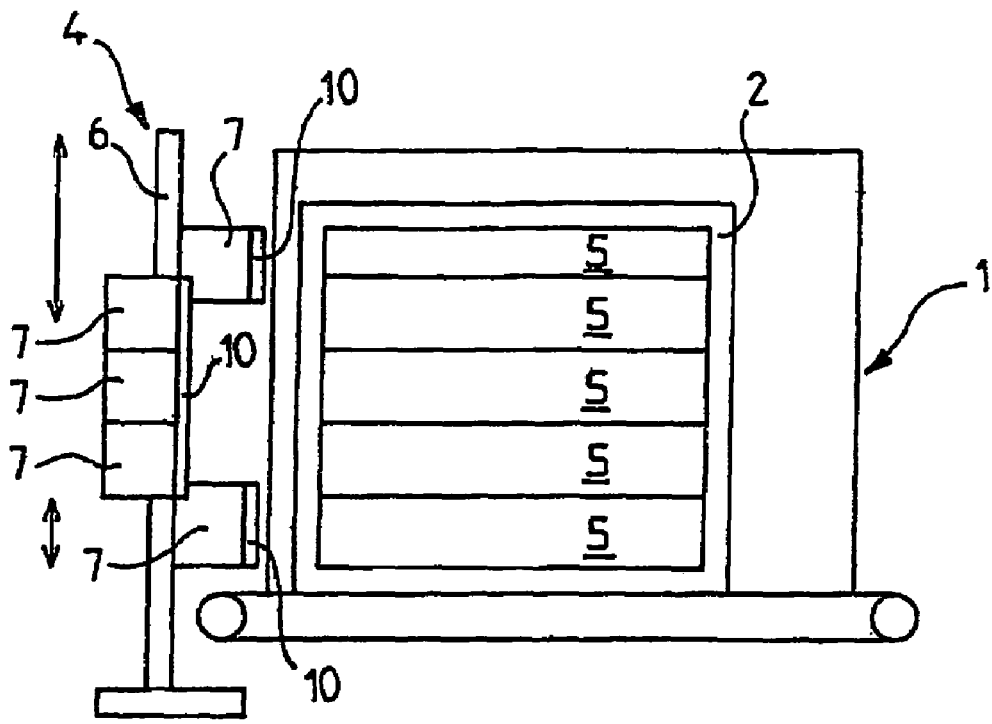
FIG. 1 is a functional diagram of a film-coating machine according to the invention, in front view.
Figure 2:
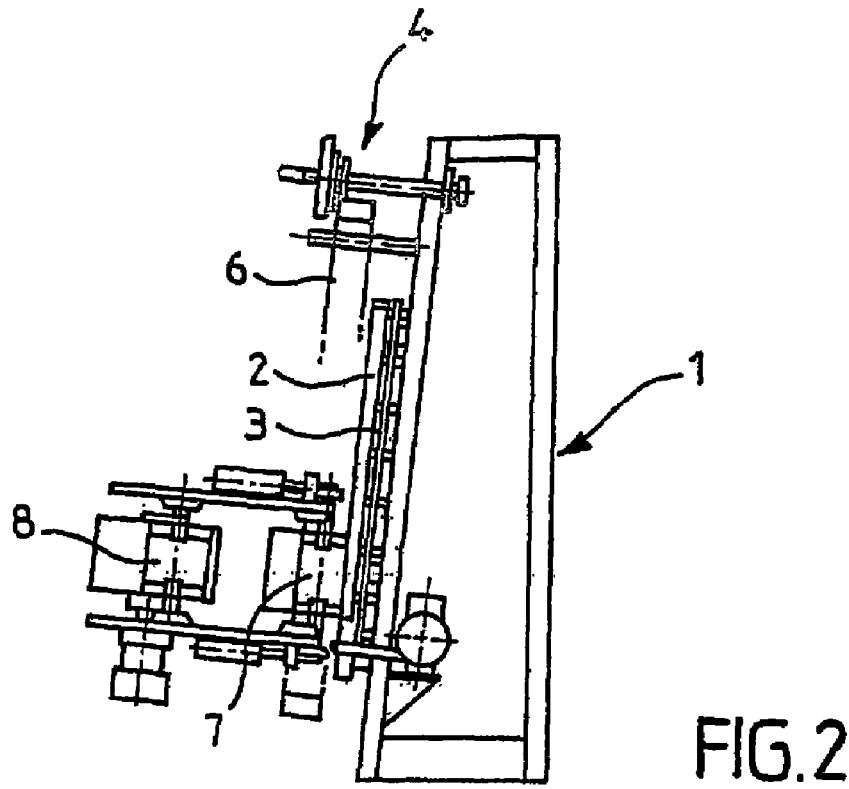
FIG. 2 is a diagrammatic view in partial side elevation of the machine of FIG. 1.

If reference is made to FIGS. 1 and 2, it can be seen that a general diagram has been represented of a film-coating machine according to the invention which comprises a frame 1 for the support and transfer of glass sheets 2, the frame 1 having at the front a supporting plane 3 with air cushion, which supporting plane is inclined rearward by an angle of the order of 6° relative to the vertical. The transfer of the sheets 2 is carried out by a drive system using belts or rollers.

The machine likewise comprises an applicator device 4 for horizontal film bands 5. The device 4 comprises a beam 6 having the same inclination as the sheets 2 which are transferred in front of it.

Figure 3:
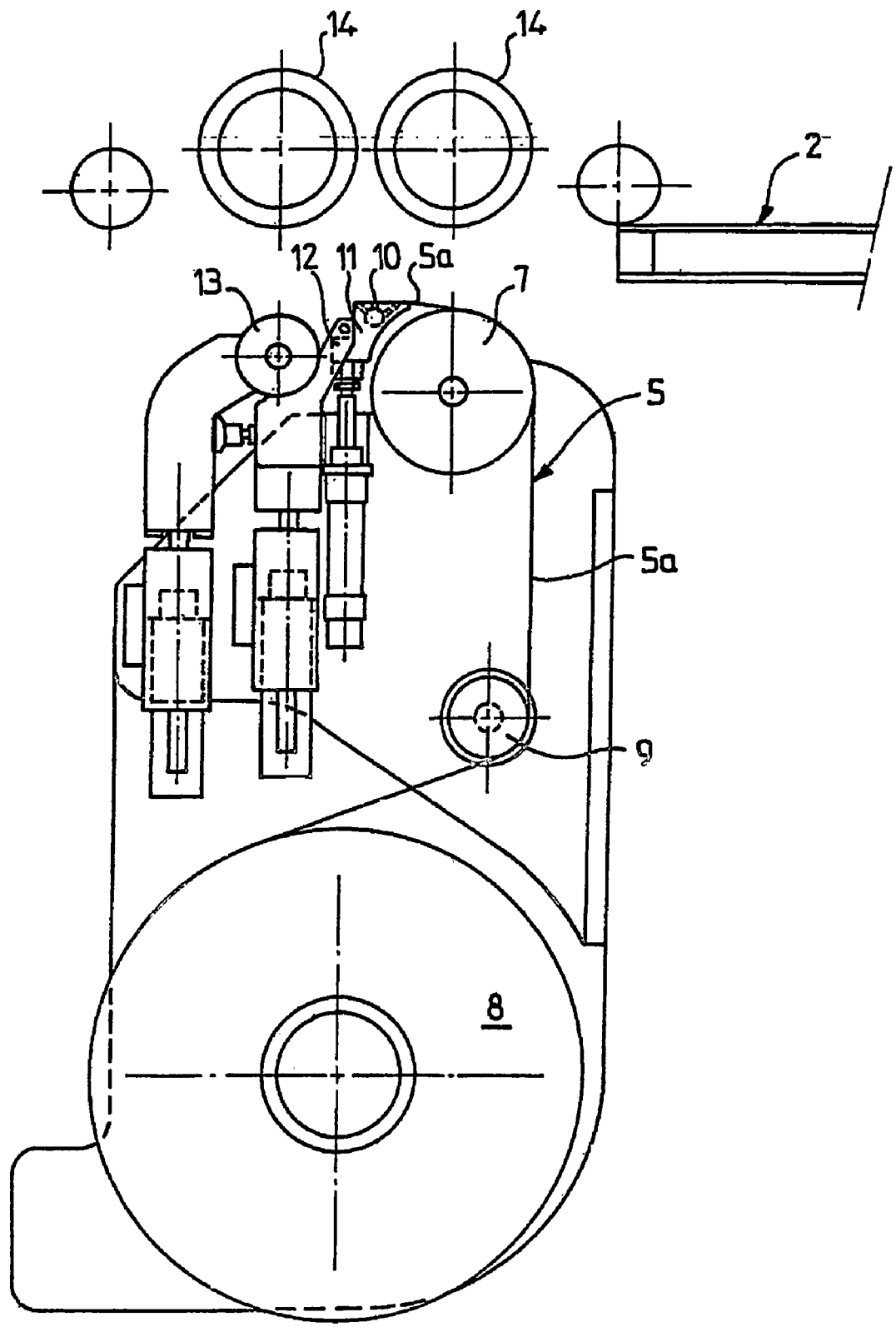
FIG. 3 is, on an enlarged scale, a diagrammatic view in a horizontal plane of a module for applying the peelable protective film.

Mounted at different heights on the beam 6 are a plurality of application modules, each comprising an applicator roll 7 as represented in FIG. 3.

The upper and lower applicator rolls 7 are adjustable in height as a function of the unprotected lower and upper horizontal margins which are wanted to be set aside on the glass sheets 2. In the represented example, the lower roll is adjustable over a smaller distance.

The intermediate rolls are three in number: in the illustrated example they are not adjustable, their spacing being fixed in advanced.

If reference is made to FIG. 3, it can be seen that an applicator roll 7 has fed over it the film 5, the outer surface 5a of which is that which is adhesive, said film being unwound from a reel 8 and passing over a film-tensioning deflector roll 9. A free end 10 of film 5 is thus formed, which is presented facing the sheet 2 to be protected by the film bands (the sheet 2 is here a double glazing), which free end is transferred in front of it.

The free end 10 is held facing the sheet 2 by a suction nozzle 11 downstream of the applicator roll 7. This nozzle 11 is retractable when not in use, the free end 10 then being freed to proceed to apply itself to the sheet 2.

Downstream of the nozzle 11, there are also successively provided a hot wire 12 for cutting the film, likewise with retraction facility, and an application roll 13 subsequent to the film being cut, the role of which is to eliminate any air bubbles between film and sheet.

Counter-rolls 14 are mounted opposite the rolls 7 and 13 to promote the application of the film.

The application module of FIG. 3 is capable of receiving reels of different heights. The suction device is designed and dimensioned to accept these variations in height. This module can be mounted on a rail in order to adjust to the dimensions of the glass sheet or of the make up height of the film.

A roll lamination cycle on a vertical film-coating machine might be described as follows:

Step 1: The end of the film is taken up by the suction band; a vacuum is created on the suction pad; the glass is loaded onto the conveyor before the detection cell for the glass edges; the application rolls are withdrawn;

Step 2: advancement of the glass; the front edge is detected by the cell;

Step 3: advancement of the glass by the distance "cell/edge of the film";

Step 4: pressing of the rolls onto the glass; breaking of the vacuum;

Step 5: withdrawal of the glass for bonding the beginning of the film;

Step 6: advancement of the glass (lamination of the film); detection of the rear edge for the cell;

Step 7: advancement of the glass; withdrawal of the module;

Step 8: advancement of the rear edge of the glass in front of the cutting wire; suction of the film by the suction pad;

Step 9: cutting of the film with the hot wire;

Step 10: withdrawal of the hot wire;

Step 11: removal of the glass, end of the lamination with the small lamination.

It is evident that numerous embodiments and variants could be envisaged without, nevertheless, departing from the scope of the present invention.

The invention claimed is:

1. A method for depositing at least one functional film on at least a part of one face or both faces of one or more flat or curved substrates, comprising:

leading each of the substrates one by one into a film-coating station so as to be advanced therein in a direction of advancement along a plane or a mean plane of the substrate, the substrate being a glass sheet, a film applicator unit, comprising at least one axis perpendicular to the direction of advancement and parallel to a plane of advancement of the substrate, being disposed in the film-coating station, multiple reels of film being mounted on the at least one axis;

adjusting an upper one and a lower one of the multiple reels of film to set aside margins on opposing edges of the substrate;

applying in the film coating station, a leader of the film of each of the multiple reels to, and holding the leader against, one face of the substrate at a varying location on the substrate;

unwinding the multiple reels of film with a view to the film being applied in a strip to the advancing substrate;

cutting the film at a varying location on the substrate; and holding a new film leader to be applied at a varying location on a same substrate, or on a following substrate, wherein a band width of each of the multiple reels and locations of the multiple reels on the at least one axis are chosen as a function of regions of the substrates which are to be covered by each film.

2. The method as claimed in claim 1, wherein, on one face of the substrate, in the direction of advancement of the substrate, as many parallel bands or strips can be applied as there are reels, the beginning and the end of each of the parallel bands being precisely positioned on the substrate, the parallel bands being mutually spaced apart, and an application of the bands is configured to be halted and resumed on the same substrate during an advancement of the substrate.

3. The method as claimed in claim 1, wherein the at least one axis includes at least two parallel axes, each of the at least two parallel axes bearing at least one of the multiple reels, one of the at least one of the multiple reels being borne by one of the at least two parallel axes staggered relative to at least one of the at least one of the multiple reels borne by a neighboring one of the at least two parallel axes, whereby on the one face of the substrate, in the direction of advancement of the substrate, as many parallel bands or strips can be applied as there are reels, the beginning and the end of each of the parallel bands being precisely positioned on the substrate, the parallel bands being configured to overlap according to the locations of two of the multiple reels on their respective ones of the at least two parallel axes, and an application of the bands is configured to be halted and resumed on the same substrate during an advancement of the substrate.

4. The method as claimed in claim 1, wherein each of the substrates is fed into the film-coating station vertically or in a position slightly inclined relative to vertical.

5. The method as claimed in claim 1, wherein each of the substrates is fed horizontally into the film-coating station.

6. The method as claimed in claim 1, wherein the at least one functional film is peelable, bonded, partially bonded, bonded on pre-cut zones, or is for transferring a decal.

7. The method as claimed in claim 1, wherein the at least one functional film is chosen from amongst a group consisting of protective films, decorative films, information-carrying films, and mechanical reinforcement films.

8. The method as claimed in claim 1, wherein the substrates are glass sheets having, on at least the one face, a functional layer, the glass sheets being flat or with rounded or curved faces, the glass sheets being configured to form panes or to be cut to obtain the panes or being configured to form windshields or automobile windows.

9. The method as claimed in claim 8,
wherein the substrates are flat glass sheets configured to be cut to form the panes,
wherein an application of peelable protective film strips is carried out so that uncoated zones are arranged in a grid pattern, each zone coated by a strip corresponding to daylight of a pane, and
the uncoated zones are configured to allow a direct cutting of the glass, forming the margins of the panes, which are configured to be introduced into rabbets of frames and to be hidden from view by glazing beads.

10. The method as claimed in claim 8, wherein the substrates are curved glass sheets, wherein a film is chosen, such that extensibility properties of the film allow the film to be applied to application regions and/or a width of the reels and of the strips is regulated as a function of the radius of curvature of the substrates, the width of the strips being smaller than the radius of curvature.

11. The method as claimed in claim 1, further comprising:
defining for each of the substrates, as a function of an intended purpose of the substrate and on at least one outer face of the substrate, a region or regions which are to receive the film and a region or regions which are not to receive the film;
feeding the substrates successively into the film-coating station and commanding, for each of the substrates, an application of the film in the regions which are to receive the film; and
gathering the substrates.

12. The method as claimed in claim 11, wherein, by a computerized calculation, a positioning of the film on different substrates of the substrates is realized as a function of dimensions of the substrates and a relative position of the regions to receive the film and the regions which are not to receive the film.

13. The method as claimed in claim 12, wherein the positioning is realized as a function of a fitment of the multiple reels and reels that the fitment is configured to receive.

* * * * *